US011618343B2

(12) United States Patent
Schoeneman et al.

(10) Patent No.: US 11,618,343 B2
(45) Date of Patent: Apr. 4, 2023

(54) DEAERATION DEVICES FOR ELECTRIFIED VEHICLE THERMAL MANAGEMENT SYSTEMS

(71) Applicant: FORD GLOBAL TECHNOLOGIES, LLC, Dearborn, MI (US)

(72) Inventors: Christian Brent Schoeneman, Southgate, MI (US); Michael Joseph Giunta, Livonia, MI (US); Todd Louis Wenzel, Detroit, MI (US); Paul Johnson, Essex (GB); Meghraj Bhagat, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 213 days.

(21) Appl. No.: 17/088,829

(22) Filed: Nov. 4, 2020

(65) Prior Publication Data
US 2022/0134906 A1    May 5, 2022

(51) Int. Cl.
| | |
|---|---|
| *H01M 10/613* | (2014.01) |
| *B60L 58/26* | (2019.01) |
| *B60L 50/60* | (2019.01) |
| *B60K 1/04* | (2019.01) |
| *H01M 10/625* | (2014.01) |
| *H01M 10/6568* | (2014.01) |
| *B60K 1/00* | (2006.01) |

(52) U.S. Cl.
CPC ............... *B60L 58/26* (2019.02); *B60K 1/04* (2013.01); *B60L 50/60* (2019.02); *H01M 10/613* (2015.04); *H01M 10/625* (2015.04); *H01M 10/6568* (2015.04); *B60K 2001/005* (2013.01); *H01M 2220/20* (2013.01)

(58) Field of Classification Search
CPC .... B60K 1/04; B60K 11/02; B60K 2001/003; B60K 2001/005; B60L 50/60; B60L 58/26; F01P 11/028; F01P 11/029; H01M 10/613; H01M 10/625; H01M 10/6568; H01M 2220/20; Y02E 60/10; Y02T 10/70
See application file for complete search history.

(56) References Cited

U.S. PATENT DOCUMENTS

| | | | |
|---|---|---|---|
| 8,966,917 | B2 | 3/2015 | O'Rourke et al. |
| 10,267,212 | B1 | 4/2019 | Schoeneman et al. |
| 2019/0112966 | A1* | 4/2019 | Schoeneman ........... B60L 58/26 |

FOREIGN PATENT DOCUMENTS

| | | | | |
|---|---|---|---|---|
| FR | 2730272 B1 | | 4/1997 | |
| SE | 413427 B | * | 5/1980 | ............. F01P 11/02 |
| WO | 2019/203701 A1 | | 10/2019 | |

OTHER PUBLICATIONS

Machine Translation SE413427B (Year: 1980).*

* cited by examiner

*Primary Examiner* — Victoria H Lynch
(74) *Attorney, Agent, or Firm* — David B. Kelley; Carlson, Gaskey & Olds, P.C.

(57) ABSTRACT

This disclosure details thermal management systems with two or more cooling loops for thermally managing multiple components of an electrified vehicle. An exemplary thermal management system may include a deaeration device that is fluidly connected to two or more cooling loops (e.g., a traction battery pack loop, a power electronics loop, etc.). The deaeration device is configured to allow for deaeration of the two or more cooling loops while reducing coolant transfer and heat transfer between the two or more cooling loops.

20 Claims, 3 Drawing Sheets

DEAERATION DEVICES FOR ELECTRIFIED VEHICLE THERMAL MANAGEMENT SYSTEMS

TECHNICAL FIELD

This disclosure relates to electrified vehicles, and more particularly to thermal management systems that employ a deaeration device for removing entrained air from fluids circulated within two or more cooling loops of the thermal management system.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

Many electrified vehicles employ thermal management systems having multiple independent cooling loops or circuits. Fluid, such as a coolant, can be circulated through the cooling loops to control the thermal energy levels of various components, such a high voltage traction battery pack, for example.

SUMMARY

A thermal management system according to an exemplary aspect of the present disclosure includes, among other things, a first fluid loop for thermally managing a first component, a second fluid loop for thermally managing a second component, and a deaeration device fluidly connected to the first fluid loop through a first inlet port and a first outlet port and fluidly connected to the second fluid loop through a second inlet port and a second outlet port.

In a further non-limiting embodiment of the foregoing system, the first component is a traction battery pack and the second component is a power electronics module.

In a further non-limiting embodiment of either of the foregoing systems, the deaeration device includes a first region that is part of the first fluid loop and a second region that is part of the second fluid loop.

In a further non-limiting embodiment of any of the foregoing systems, the first region is separated from the second region by a baffle of the deaeration device.

In a further non-limiting embodiment of any of the foregoing systems, a standpipe protrudes upwardly from the baffle.

In a further non-limiting embodiment of any of the foregoing systems, the first region and the second region establish separate horizontal swirl chambers inside the deaeration device.

In a further non-limiting embodiment of any of the foregoing systems, the first inlet port is rotationally offset from the first outlet port, and the second inlet port is rotationally offset from the second outlet port.

In a further non-limiting embodiment of any of the foregoing systems, the first inlet port is vertically offset from the first outlet port, and the second inlet port is vertically offset from the second outlet port.

In a further non-limiting embodiment of any of the foregoing systems, a first swirl flow path between the first inlet port and the first outlet port extends over a range that is configured to induce the formation of a first vortex.

In a further non-limiting embodiment of any of the foregoing systems, a second swirl flow path between the second inlet port and the second outlet port extends over a range that is configured to induce the formation of a second vortex.

In a further non-limiting embodiment of any of the foregoing systems, the deaeration device includes a deaeration port that is in fluid communication with a reservoir.

In a further non-limiting embodiment of any of the foregoing systems, the reservoir is configured to hold a volume of air that is deaerated from the first fluid loop and the second fluid loop.

In a further non-limiting embodiment of any of the foregoing systems, the deaeration device is configured such that the volume of air that is deaerated from the first fluid loop passes through a standpipe prior to entering the deaeration port.

In a further non-limiting embodiment of any of the foregoing systems, the standpipe and the deaeration port are axially aligned inside a housing of the deaeration device.

A method according to another exemplary aspect of the present disclosure includes, among other things, communicating a first amount of a fluid through a first region of a deaeration device, communicating a second amount of the fluid through a second region of the deaeration device, and deaerating the first amount of the fluid through the second region as the first amount of the fluid is communicated through the first region.

In a further non-limiting embodiment of the foregoing method, deaerating the first amount of the fluid includes releasing air bubbles from the first amount of the fluid into a standpipe that extends from a baffle arranged between the first region and the second region.

In a further non-limiting embodiment of either of the foregoing methods, the method includes communicating the air bubbles from the standpipe to a deaeration port of the deaeration device.

In a further non-limiting embodiment of any of the foregoing methods, the method includes deaerating the second amount of the fluid through the second region.

In a further non-limiting embodiment of any of the foregoing methods, deaerating the second amount of the fluid includes releasing air bubbles from the second amount of the fluid into a standpipe that extends from a baffle arranged between the first region and the second region.

In a further non-limiting embodiment of any of the foregoing methods, communicating the first amount of the fluid includes circulating the first amount of the fluid along a first swirl flow path within the first region and communicating the second amount of the fluid includes circulating the second amount of the fluid along a second swirl flow path within the second region.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details thermal management systems with two or more cooling loops for thermally managing multiple components of an electrified vehicle. An exemplary thermal management system may include a deaeration device that is fluidly connected to two or more cooling loops (e.g., a traction battery pack loop, a power electronics loop, etc.). The deaeration device is configured to allow for deaeration of the two or more cooling loops while reducing coolant transfer and heat transfer between the two or more cooling loops. These and other features are discussed in greater detail in the following paragraphs of this detailed description.

Figure 1:
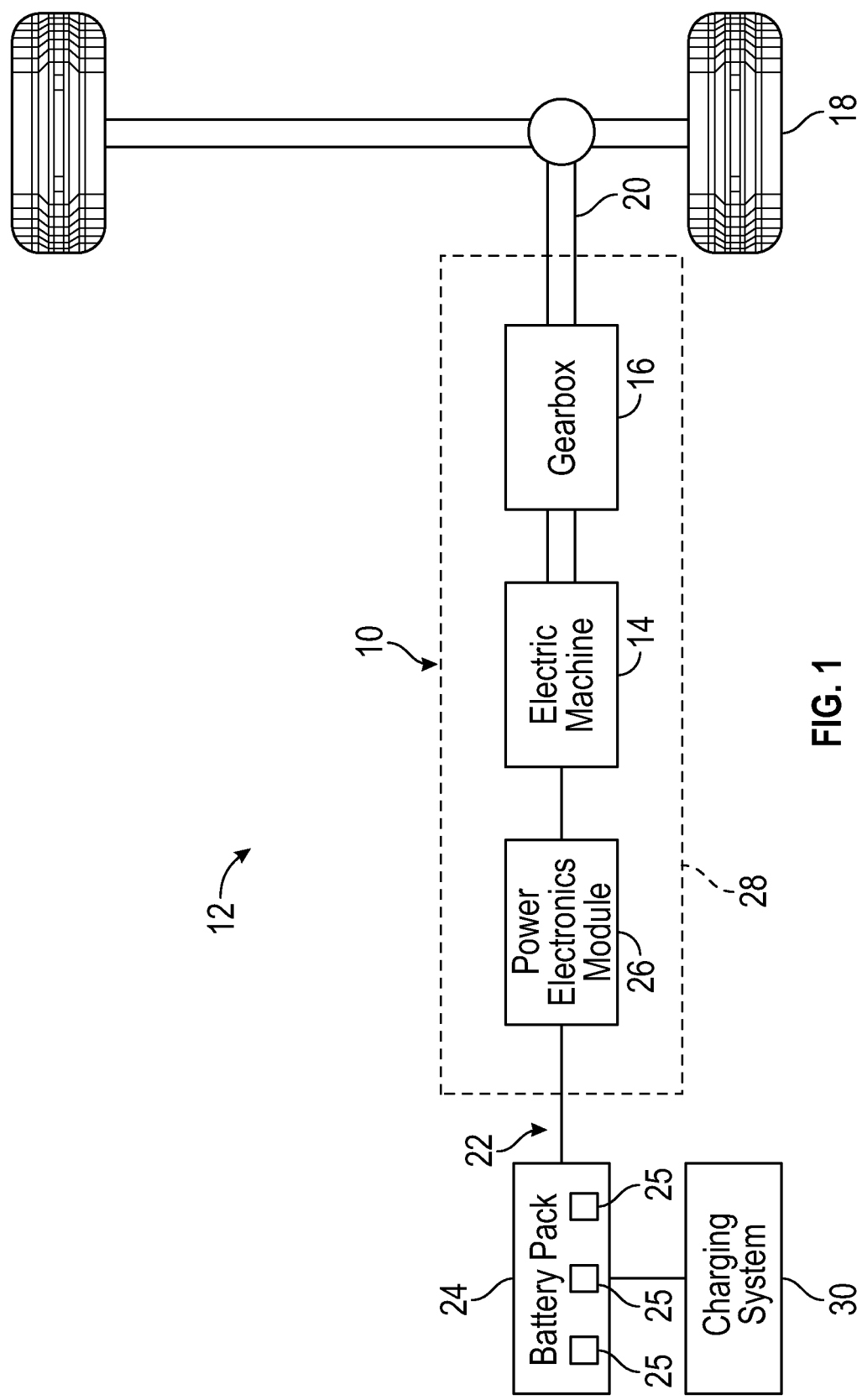
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). However, it should be understood that the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not shown in this embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output torque. The electric machine 14 may be operably connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a traction battery pack 24 through a power electronics module 26. The power electronics module 26 may include a charger, a DC-DC converter, a motor controller (which may be referred to as an inverter system controller or ISC), etc. The electric machine 14, the gearbox 16, and the power electronics module 26 may be collectively referred to as a transmission 28 of the electrified vehicle 12.

The traction battery pack 24 is an exemplary electrified vehicle battery. The traction battery pack 24 may be a high voltage traction battery pack that includes a plurality of battery arrays 25 (e.g., battery assemblies or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also be equipped with a charging system 30 for charging the energy storage devices (e.g., battery cells) of the traction battery pack 24. The charging system 30 may include charging components that are located both onboard the electrified vehicle 12 (e.g. vehicle inlet assembly, on-board charging module, etc.) and external to the electrified vehicle 12 (e.g., electric vehicle supply equipment (EVSE), etc.). The charging system 30 can be connected to an external power source (e.g., a wall outlet, a charging station, etc.) for receiving and distributing power received from the external power source throughout the electrified vehicle 12.

The powertrain 10 depicted by FIG. 1 is highly schematic and is not intended to limit this disclosure. Various additional components could alternatively or additionally be employed by the powertrain 10 within the scope of this disclosure.

Figure 2:
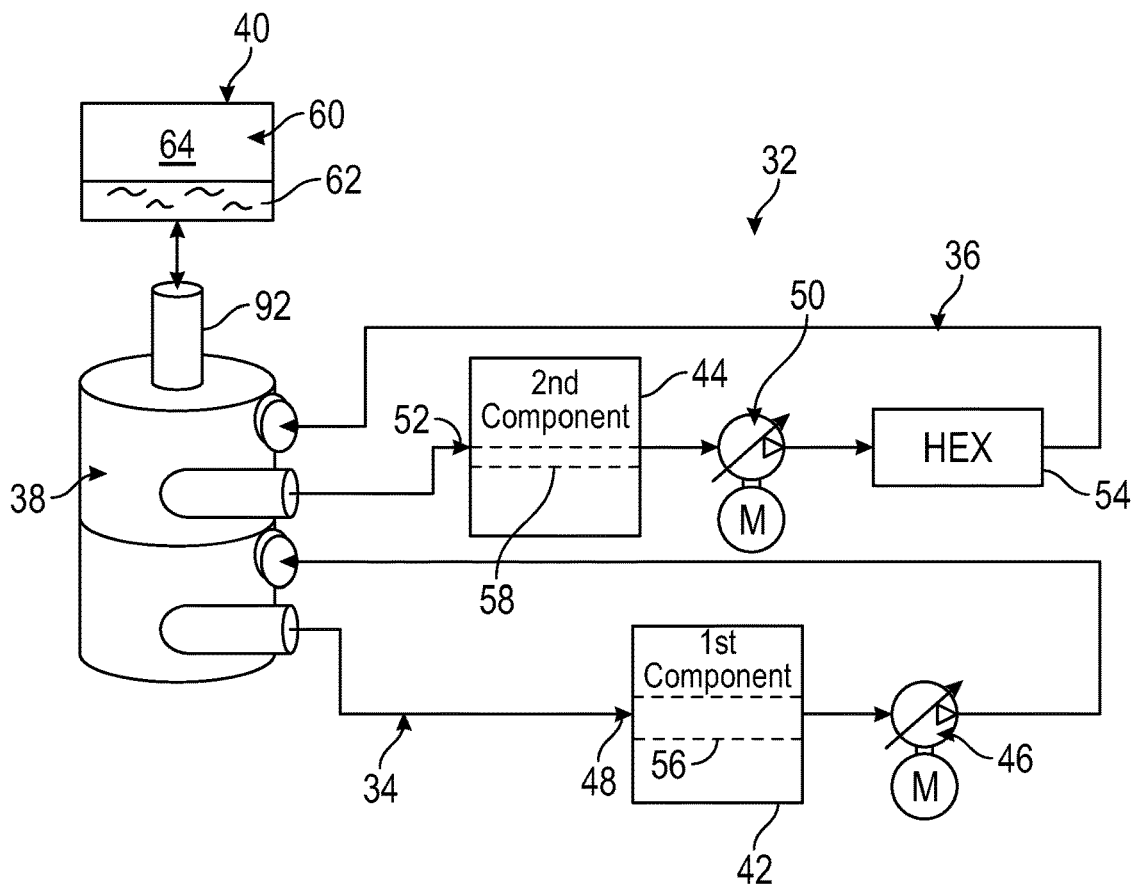
FIG. 2 schematically illustrates a thermal management system for thermally managing multiple components of an electrified vehicle.

FIG. 2 schematically illustrates a thermal management system 32 that can be incorporated into an electrified vehicle, such as the electrified vehicle 12 of FIG. 1, for example, for thermally managing various vehicle components. The thermal management system 32 is described in connection with a BEV, however, other types of electrified vehicles, and even conventional vehicles, could benefit from the teachings of the thermal management system 32.

The thermal management system 32 may include a first fluid loop 34, a second fluid loop 36, a deaeration device 38, and a reservoir 40. Although only schematically shown, the various components of the thermal management system 32 can be fluidly interconnected by various conduits or passages such as tubes, hoses, pipes, etc.

The first fluid loop 34 extends from the deaeration device 38 to a first component 42 of the electrified vehicle 12. The second fluid loop 36 extends from the deaeration device 38 to a second component 44 of the electrified vehicle 12. In an embodiment, the first component 42 is the traction battery pack 24 of the powertrain 10, and the second component 44 is the power electronics module 26 of the powertrain 10. Other components of the powertrain 10 could alternatively or additionally be thermally managed by the thermal management system 32. The first fluid loop 34 and the second fluid loop 36 are illustrated in the exemplary embodiment. However, the thermal management system 32 could include two or more fluid loops.

A first pump 46 may circulates a first amount 48 of a fluid, such as a coolant (e.g., water mixed with ethylene glycol or any other suitable coolant) through the first fluid loop 34 for thermally managing the first component 42. The first amount 48 of the fluid may take on thermal energy from the first component 42 to cool the first component 42. Although not shown, the first amount 48 of the fluid could be circulated through a heat exchanger for releasing the heat picked up from the first component 42 to the ambient air.

A second pump 50 may circulate a second amount 52 of the fluid through the second fluid loop 36 for thermally managing the second component 44. The second amount 52 of the fluid may circulate from the second component 44 to a heat exchanger 54. The second amount 52 of the fluid may accept thermal energy from the second component 44 to cool the second component 44. Thermal energy in the second amount 52 of the fluid may then be rejected to atmosphere at the heat exchanger 54. In an embodiment, the heat exchanger 54 is a radiator (i.e., a fluid-to-air heat exchanger).

The first pump 46 and the second pump 50 can be the same, or different, types of pumps. In an embodiment, the first pump 46 and the second pump 50 are electrically powered fluid pumps. Other types of fluid pumps could be utilized as part of the thermal management system 32 within the scope of this disclosure.

In an embodiment, the first amount 48 of the fluid may be circulated through a first internal cooling circuit 56 associated with the first component 42 and the second amount 52 of the fluid may be circulated through a second internal cooling circuit 58 associated with the second component 44 for removing heat from these components in a convective heat transfer process. The first and second internal cooling circuits 56, 58 may be established by heat changer plate assemblies associated with the first and second components 42, 44, for example.

Usage of the first fluid loop 34 and the second fluid loop 36 permits thermal energy levels of the first component 42 and the second component 44 to be maintained at different temperatures. In an embodiment, the first component 42 is configured to be cooled by the first amount 48 of the fluid to a first temperature, and the second component 44 is configured to be cooled by the second amount 52 of the fluid to a second temperature that is different than the first temperature. Accordingly, the first fluid loop 34 and the second fluid loop 36 are configured such that a maximum temperature of the first amount 48 of the fluid within first fluid loop 34 is different than a maximum temperature of the second amount 52 of the fluid within the second fluid loop 36. In an embodiment, a maximum temperature of the first amount 48 of the fluid within the first fluid loop 34 is about 45° C., and a maximum temperature of the second amount 52 of the fluid within the second fluid loop 36 is about 70° C. In this disclosure, the term "about" means that the expressed quantities or ranges need not be exact but may be approximated and/or larger or smaller, reflecting acceptable tolerances, conversion factors, measurement error, etc. A typical industry maximum temperature for a traction battery pack is about 45° C., which sets, in this example, the maximum temperature of the first amount 48 of the fluid.

The deaeration device 38 is fluidly connected to both the first fluid loop 34 and the second fluid loop 36. As discussed in greater detail below, the deaeration device 38 is configured to deaerate the first amount 48 and the second amount 52 of the fluid that is circulated through the first fluid loop 34 and the second fluid loop 36, respectively. Removing the entrained air from the fluid can be important for providing proper circulation of the fluid through the first and second fluid loops 34, 36.

The reservoir 40 is fluidly connected to the deaeration device 38. The reservoir 40 may be positioned vertically above the deaeration device 38. The reservoir 40 includes an interior area 60 that can hold a supply 62 of the fluid. Fluid from the supply 62 may be gravity fed to the deaeration device 38 (e.g., via a deaeration port 92) as the fluid expands and contracts. In an embodiment, the supply 62 of the fluid within the reservoir 40 is maintained such that fluid remains in the reservoir 40 even when some of the fluid has gravity fed into the deaeration device 38 to compensate for thermal contraction of the first amount 48 of the fluid and the second amount 52 of the fluid.

The interior area 60 of the reservoir 40 may further includes a region 64 of air, which can include air deaerated from the first fluid loop 34, air deaerated from the second fluid loop 36, or both. As air deaerates from within the first fluid loop 34 and/or the second fluid loop 36, the air moves vertically upward from the deaeration device 38 and into the region 64 of the air within the reservoir 40. The volume of the first and second fluid loops 34, 36 previously occupied by the air can then be replaced with fluid from the supply 62.

Figure 3:
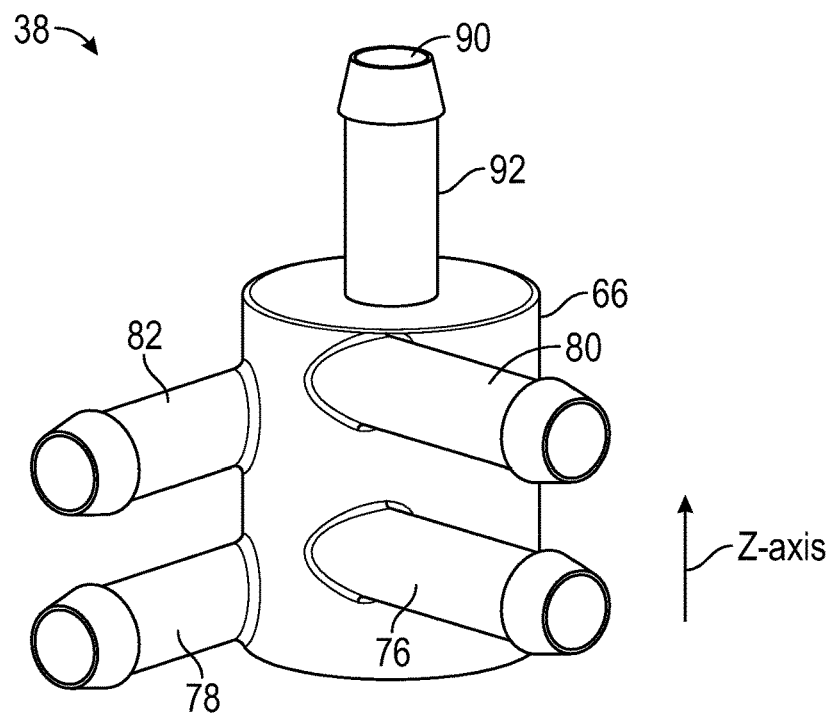
FIG. 3 illustrates a deaeration device of the thermal management system of FIG. 2.
Figure 4:
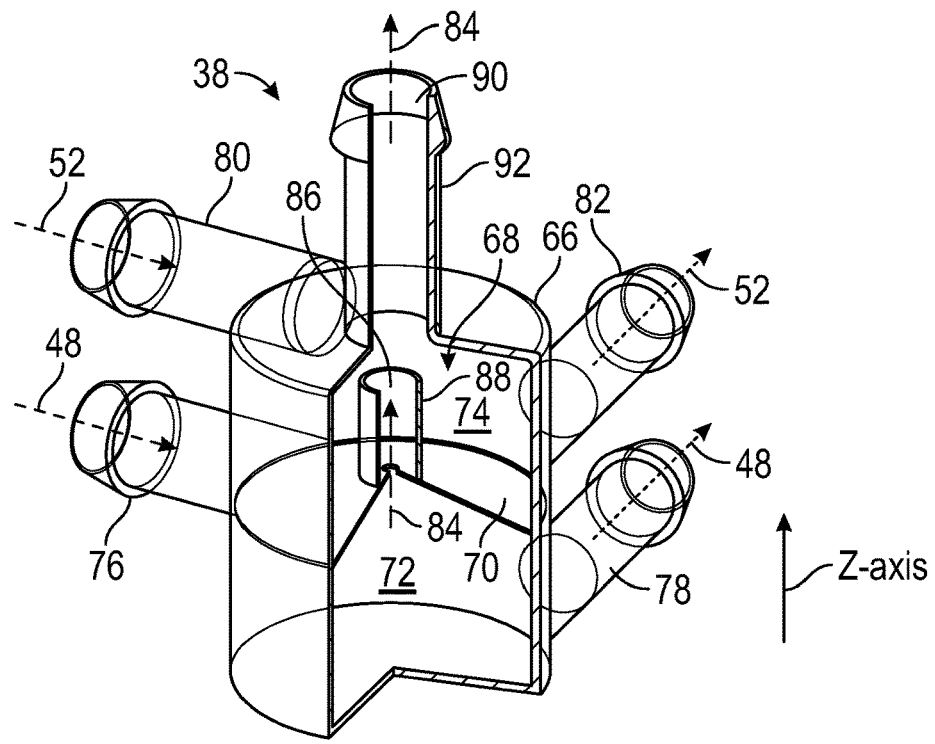
FIG. 4 is a partial sectional view of the deaeration device of FIG. 3.
Figure 5:
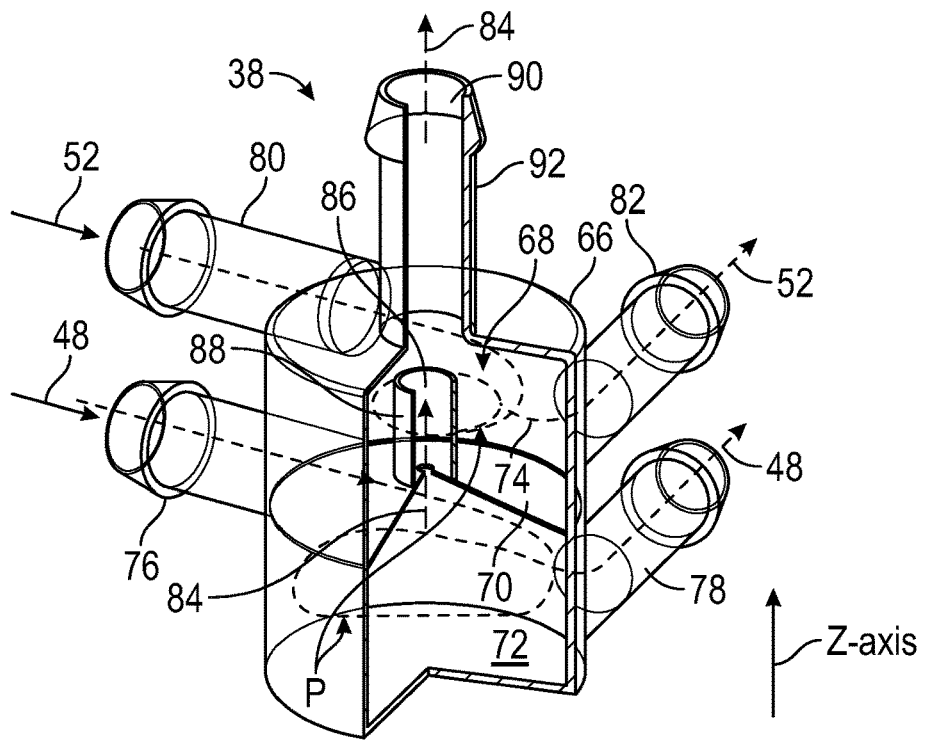
FIG. 5 schematically illustrates swirl flow paths of a fluid communicated through the deaeration device of FIG. 3.

FIGS. 3-5, with continued reference to FIGS. 1-2, illustrate additional features associated with the exemplary deaeration device 38 of the thermal management system 32. The deaeration device 38 may include a housing 66 that establishes an interior area 68 (see FIG. 4). A baffle 70 (see FIG. 4) extends within the housing 66 to divide the interior area 98 into a lower or first region 72 and an upper or second region 74. Although only a single baffle 70 is illustrated in this embodiment, additional baffles could be incorporated if, for example, more than two fluid loops circulate through the interior area 68 of the deaeration device 38. The baffle 70 is configured to prevent fluid from moving between the first region 72 and the second region 74. The first amount 48 and the second amount 52 of the fluid are therefore fluidly isolated by the baffle 70.

The first region 72 may be part of the first fluid loop 34 of the thermal management system 32, and the second region 74 may be part of the second fluid loop 36 of the thermal management system 32. The first amount 48 of the fluid may therefore flow through the first region 72 when circulated through the first fluid loop 34, and the second amount 52 of the fluid may flow through the second region 74 when circulated through the second fluid loop 36.

In an embodiment, due to the higher operating temperatures of the second component 44, the second region 74 of the deaeration device 38 is positioned vertically above the first region 72 (in the Z-axis), thereby substantially reducing the potential for thermal mixing of the first amount 48 and the second amount 52 of the fluid. The stacking order between the second region 74 and the first region 72 is therefore configured to minimize heat transfer and fluid transfer between the first and second fluid loops 34, 36.

The first amount 48 of the fluid may enter the first region 72 through a first inlet port 76 of the deaeration device 38 and may exit from the first region 72 through a first outlet port 78 of the deaeration device 38. The second amount 52 of the fluid may enter the second region 74 through a second inlet port 80 of the deaeration device 38 and may exit from the second region 74 through a second outlet port 82 of the deaeration device 38.

The first and second regions 72, 74 are arranged to establish separate horizontal swirl chambers inside the deaeration device 38. The fluid that enters into either the first region 72 through the first inlet port 76 or into the second region 74 through the second inlet port 80 may flow along a swirl flow path P (see FIG. 5) prior to exiting through either the first outlet port 78 or the second outlet port 82, respectively. In an embodiment, the fluid traveling along the swirl flow path P swirls around the first region 72 or the second region 74 over a minimum range of about 270° prior to exiting through the first outlet port 78 or the second outlet port 82. However, other swirl ranges are also contemplated within the scope of this disclosure and may be dependent on the deaeration requirements of the thermal management system 32, among other factors. Communicating the fluid along the swirl flow paths P reduces the speed of the fluid flow and may induce a vortex within the fluid flow, thereby increasing the amount of air that can be removed from the fluid.

In an embodiment, the first inlet port 76 and the first outlet port 78 are both rotationally offset from one another and offset from one another along the Z-axis, and the second inlet port 80 and the second outlet port 82 are also both rotationally offset from one another and offset from one another along the Z-axis. The Z-axis offsets can help create the swirl flow paths P of the fluid that is communicated through the deaeration device 38. In an embodiment, the first inlet port 76 is located vertically higher on the housing 66 than the first outlet port 78, and the second inlet port 80 is located vertically higher on the housing 66 than the second outlet port 82.

Entrained air may be removed from the first amount 48 and the second amount 52 of the fluid during operation of the thermal management system 32 in the following manner. As the first amount 48 of the fluid enters the first region 72 via the first inlet port 76 and the second amount 52 of the fluid enters the second region 74 via the second inlet port 80, the fluids are communicated along their respective swirl flow paths P. As a result, air bubbles 84 may be released from the first amount 48 and the second amount 52 of the fluid, thereby deaerating the first amount 48 and the second amount 52 of the fluid. The air bubbles 84 released from the first amount 48 of the fluid may exit through a passage 86 of a standpipe 88 that extends upwardly from the baffle 70 prior to exiting through a passage 90 of the deaeration port 92 of the deaeration device 38. The first amount 48 of the fluid is therefore deaerated through the second region 74 of the deaeration device 38. In an embodiment, the passages 86, 90 are axially aligned with one another. The air bubbles 84 released from the second amount 52 of the fluid may simply exit through the passage 90 of the deaeration port 92.

The deaeration port 92 may be fluidly connected to the reservoir 40 (see FIG. 2). Thus, the air bubbles 84 may accumulate within the region 64 of air of the reservoir 40 and may be replaced within the first and second fluid loops 34, 36 by fluid from the supply 62 of the reservoir 40. The deaeration port 92 may therefore also function as a fill port of the deaeration device 38. The air that is "bubbled up" through the stand pipe 88 and the deaeration port 92 are therefore displaced by fluid through gravity (buoyancy).

The exemplary thermal management systems of this disclosure incorporate a deaeration device that is capable of providing deaeration of two or more separate thermal management cooling loops. The deaeration device is capable of reducing coolant transfer and heat transfer between the two or more cooling loops.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A thermal management system, comprising:
    a first fluid loop for thermally managing a first component;
    a second fluid loop for thermally managing a second component; and
    a deaeration device fluidly connected to the first fluid loop through a first inlet port and a first outlet port and fluidly connected to the second fluid loop through a second inlet port and a second outlet port,
    wherein the deaeration device includes a first region that is part of the first fluid loop and a second region that is part of the second fluid loop,
    wherein the deaeration device is configured such that the first region is deaerated through the second region.

2. The system as recited in claim 1, wherein the first component is a traction battery pack and the second component is a power electronics module.

3. The system as recited in claim 1, wherein the first region is separated from the second region by a baffle of the deaeration device.

4. The system as recited in claim 3, comprising a standpipe protruding upwardly from the baffle.

5. The system as recited in claim 1, wherein the first region and the second region establish separate horizontal swirl chambers inside the deaeration device.

6. The system as recited in claim 1, wherein the first inlet port is rotationally offset from the first outlet port, and the second inlet port is rotationally offset from the second outlet port.

7. The system as recited in claim 1, wherein the first inlet port is vertically offset from the first outlet port, and the second inlet port is vertically offset from the second outlet port.

8. The system as recited in claim 1, wherein a first swirl flow path between the first inlet port and the first outlet port extends over a range that is configured to induce a formation of a first vortex.

9. The system as recited in claim 8, wherein a second swirl flow path between the second inlet port and the second outlet port extends over a range that is configured to induce a formation of a second vortex.

10. The system as recited in claim 8, wherein the range is at least 270°.

11. The system as recited in claim 1, wherein the deaeration device includes a deaeration port that is in fluid communication with a reservoir, wherein the reservoir is configured to hold a volume of air that is deaerated from the first fluid loop and the second fluid loop.

12. The system as recited in claim 11, wherein the deaeration device is configured such that the volume of air that is deaerated from the first fluid loop passes through a standpipe prior to entering the deaeration port, wherein the standpipe and the deaeration port are axially aligned inside a housing of the deaeration device.

13. The system as recited in claim 1, wherein the first region is a lower region of the deaeration device and the second region is an upper region of the deaeration device, the upper region being positioned vertically above the lower region.

14. A method, comprising:
    communicating a first amount of a fluid through a first region of a deaeration device;
    communicating a second amount of the fluid through a second region of the deaeration device;
    deaerating the first amount of the fluid through the second region as the first amount of the fluid is communicated through the first region; and
    accumulating a volume of air deaerated from the first amount of the fluid within a reservoir that is fluidly connected to the deaeration device.

15. The method as recited in claim 14, wherein deaerating the first amount of the fluid includes:

releasing air bubbles from the first amount of the fluid into a standpipe that extends from a baffle arranged between the first region and the second region.

16. The method as recited in claim 15, comprising:
communicating the air bubbles from the standpipe to a deaeration port of the deaeration device.

17. The method as recited in claim 14, comprising:
deaerating the second amount of the fluid through the second region.

18. The method as recited in claim 14, wherein:
communicating the first amount of the fluid includes circulating the first amount of the fluid along a first swirl flow path within the first region; and
communicating the second amount of the fluid includes circulating the second amount of the fluid along a second swirl flow path within the second region.

19. The method as recited in claim 14, comprising replacing the volume of air deaerated from the first amount of the fluid with a supply of fluid from the reservoir.

20. A method, comprising:

communicating a first amount of a fluid through a first region of a deaeration device;

communicating a second amount of the fluid through a second region of the deaeration device;

deaerating the first amount of the fluid through the second region as the first amount of the fluid is communicated through the first region; and deaerating the second amount of the fluid through the second region, wherein deaerating the second amount of the fluid includes:

releasing air bubbles from the second amount of the fluid into a standpipe that extends from a baffle arranged between the first region and the second region.

* * * * *